United States Patent
Hwang

(10) Patent No.: US 11,935,022 B2
(45) Date of Patent: Mar. 19, 2024

(54) UNMANNED STORE OPERATION METHOD AND UNMANNED STORE SYSTEM USING SAME

(71) Applicant: XYZ, Inc., Seoul (KR)

(72) Inventor: Sung Jae Hwang, Seongnam-si (KR)

(73) Assignee: LOUNGE'LAB INC., Seoul (KR)

( * ) Notice: Subject to any disclaimer, the term of this patent is extended or adjusted under 35 U.S.C. 154(b) by 246 days.

(21) Appl. No.: 17/544,318

(22) Filed: Dec. 7, 2021

(65) Prior Publication Data

US 2022/0101291 A1 Mar. 31, 2022

Related U.S. Application Data

(63) Continuation of application No. PCT/KR2021/001978, filed on Feb. 16, 2021.

(30) Foreign Application Priority Data

Feb. 17, 2020 (KR) .................. 10-2020-0019152

(51) Int. Cl.
G06Q 20/18 (2012.01)
G06Q 20/40 (2012.01)

(52) U.S. Cl.
CPC ........... G06Q 20/18 (2013.01); G06Q 20/401 (2013.01)

(58) Field of Classification Search
CPC .... G06Q 20/18; G06Q 20/401; G06Q 20/206; G06Q 20/327; G06Q 10/06; G06Q 10/08;
(Continued)

(56) References Cited

U.S. PATENT DOCUMENTS 5,933,813 A * 8/1999 Teicher .............. G06Q 30/0283
705/28
10,176,456 B2 * 1/2019 Puerini .............. G06Q 10/0875
(Continued)

FOREIGN PATENT DOCUMENTS

| KR | 10-2015-0093289 A | 8/2015 |
| KR | 10-2017-0028394 A | 3/2017 |
| KR | 10-1747834 B1 | 6/2017 |
| KR | 10-2019-0021183 A | 3/2019 |

(Continued)

OTHER PUBLICATIONS

International Search Report for PCT/KR2021/001978 dated May 24, 2021 [PCT/ISA/210].
(Continued)

*Primary Examiner* — A. Hunter Wilder
(74) *Attorney, Agent, or Firm* — Dinsmore & Shohl LLP

(57) ABSTRACT

According to an embodiment of the present invention, there is provided an unmanned store operation method of operating an unmanned store system including an unmanned store apparatus and an unmanned store server, the unmanned store operation method including: a user identification step of identifying a user adjacent to the unmanned store apparatus; a door opening step of unlocking the door of the unmanned store apparatus by controlling a door unit of the unmanned store apparatus; a purchase target product identification step of identifying a product selected by the user and removed from the product storage unit of the unmanned store apparatus based on the analysis of an image photographed by a camera unit; and a payment processing step of processing payment based on the identification information of the user.

16 Claims, 10 Drawing Sheets

| | PRODUCT A | PRODUCT B | PRODUCT C |
|---|---|---|---|
| NUMBER OF STOCKS | 5 | 15 | 11 |
| EXPIRATION DATE | FAR AWAY | SIGNIFICANTLY IMMINENT | IMMINENT |
| NUMBER OF VALID CUSTOMERS (NUMBER OF CUSTOMERS, WHO HAVE INSTALLED THE APP, WITHIN A PRESET SURROUNDING RADIUS) | 100 | 50 | 40 |
| NUMBER OF PROSPECTIVE CUSTOMERS (NUMBER OF NEARBY MOVING CUSTOMERS RECOGNIZED BY THE FRONT CAMERA) | 50 | 30 | 50 |
| DISCOUNT RATE | 0% | 40% | 20% |

(58) Field of Classification Search
CPC .. G06Q 20/208; G06Q 30/02; G06Q 10/0633; G06Q 10/06316; G06Q 10/087; G06Q 20/145; G06Q 20/40145; G06Q 30/0254; G06Q 30/0261; G07F 9/001; G07F 9/002; G07F 9/006; G07F 9/009; G07F 9/026; G07F 9/10; G06F 21/32; G06V 40/16; G07C 9/37; G07C 9/38; H04N 7/18
See application file for complete search history.

(56) References Cited

U.S. PATENT DOCUMENTS

| | | | |
|---|---|---|---|
| 10,282,852 B1* | 5/2019 | Buibas | G06T 7/246 |
| 10,353,982 B1* | 7/2019 | Kumar | G06F 17/00 |
| 2012/0029691 A1* | 2/2012 | Mockus | G07F 9/023 |
| | | | 700/231 |
| 2013/0284806 A1* | 10/2013 | Margalit | G07G 1/0009 |
| | | | 235/382 |

FOREIGN PATENT DOCUMENTS

| | | |
|---|---|---|
| KR | 10-2001806 B1 | 7/2019 |
| KR | 10-2061423 B1 | 12/2019 |
| KR | 10-2020-0013175 A | 2/2020 |
| WO | WO-2017066614 A1 * 4/2017 | ........... G06F 13/102 |

OTHER PUBLICATIONS

Written Opinion for PCT/KR2021/001978 dated May 24, 2021 [PCT/ISA/237].

* cited by examiner

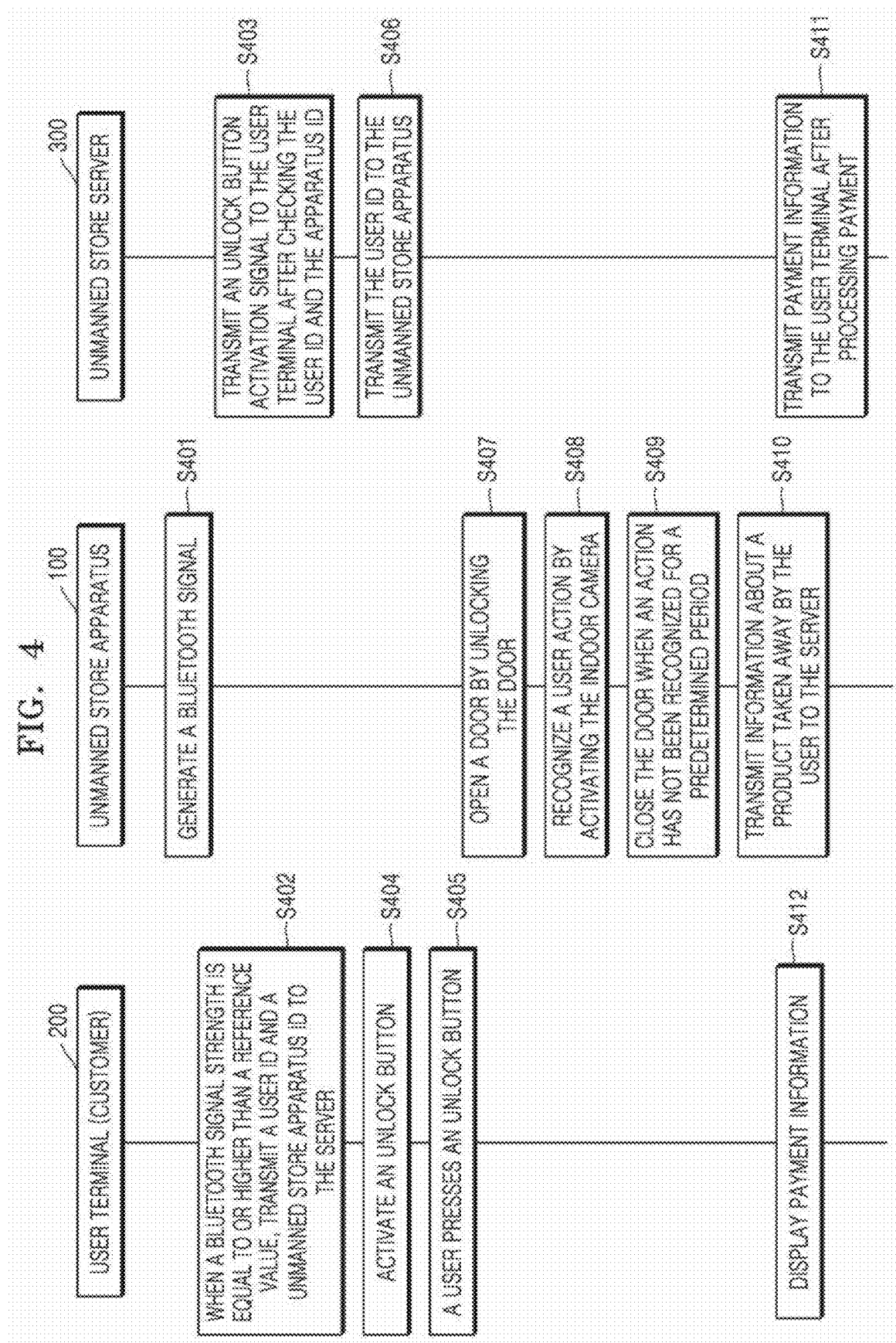

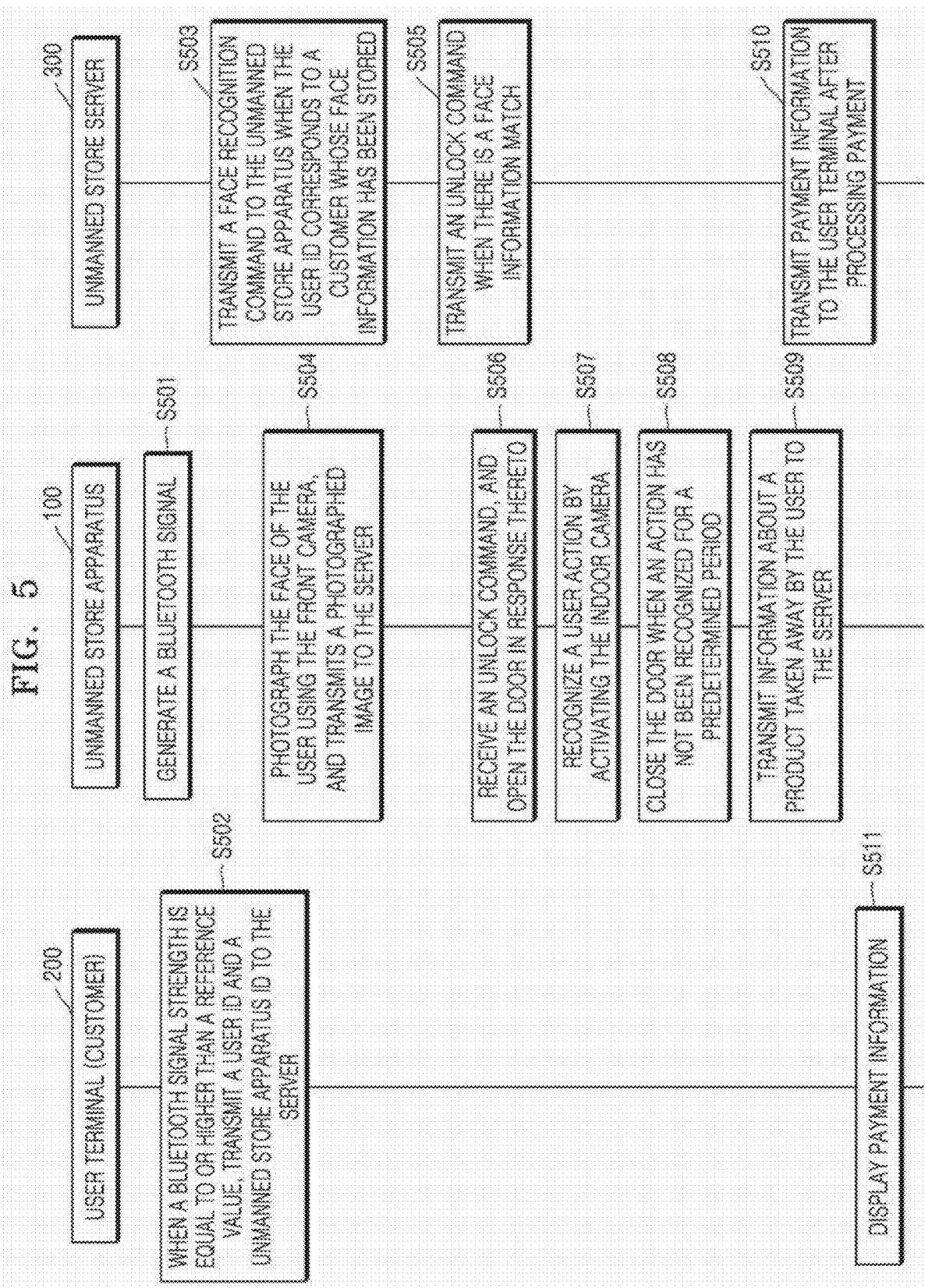

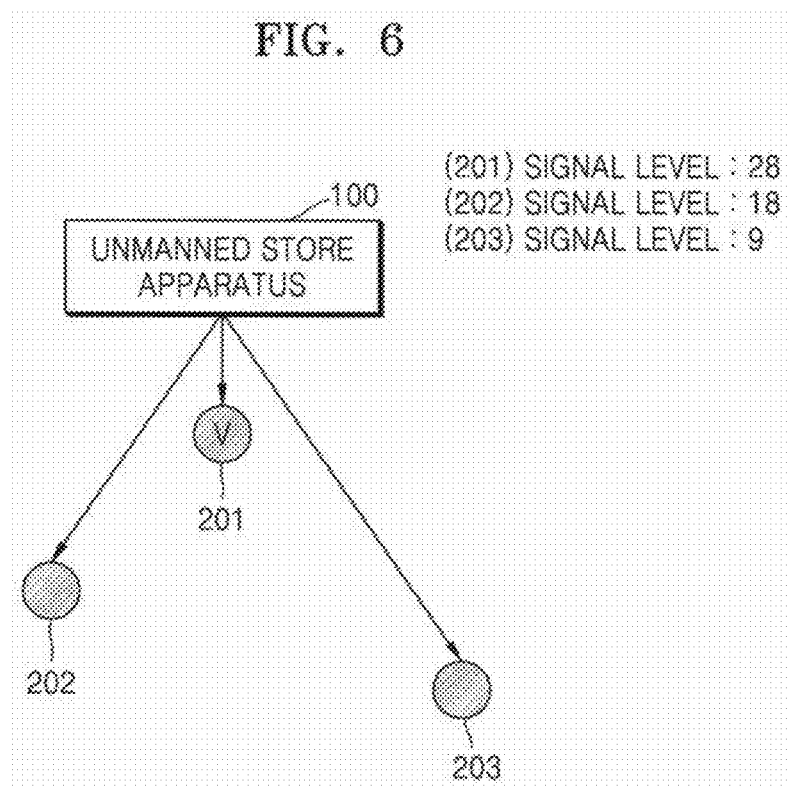

FIG. 7

|  | PRODUCT A | PRODUCT B | PRODUCT C |
|---|---|---|---|
| NUMBER OF STOCKS | 5 | 15 | 11 |
| EXPIRATION DATE | FAR AWAY | SIGNIFICANTLY IMMINENT | IMMINENT |
| NUMBER OF VALID CUSTOMERS (NUMBER OF CUSTOMERS, WHO HAVE INSTALLED THE APP, WITHIN A PRESET SURROUNDING RADIUS) | 100 | 50 | 40 |
| NUMBER OF PROSPECTIVE CUSTOMERS (NUMBER OF NEARBY MOVING CUSTOMERS RECOGNIZED BY THE FRONT CAMERA) | 50 | 30 | 50 |
| DISCOUNT RATE | 0% | 40% | 20% |

UNMANNED STORE OPERATION METHOD AND UNMANNED STORE SYSTEM USING SAME

TECHNICAL FIELD

The present invention relates to an unmanned store operation method, and an unmanned store apparatus and system using the method. More particularly, the present invention relates to an unmanned store operation method and system that can implement a GRIP AND GO function, in which when a user picks up an item, payment is made immediately, in an unmanned store that can be provided in the form of an unmanned smart vending machine by using artificial intelligence-based user behavior recognition technology.

BACKGROUND ART

An increase in the number of single-person households is leading to an increase in late-hour single-person shopping, and unmanned convenience stores and unmanned discount marts are gradually increasing to respond to this trend. Furthermore, the spread of unmanned stores is expected to gradually increase due to an increase in the burden of labor costs resulting from an increase in the minimum hourly wage and a decrease in the labor force resulting from an increase in the aging population. In addition, due to the spread of the noncontact culture, a tendency to enjoy shopping comfortably alone and to reduce the costs of contact with people is spreading.

Moreover, with the development of image recognition and artificial intelligence-based processing technology, it is possible to recognize the face or behavior of a user more accurately. In payment technology, it is possible to support more diverse and simple types of payment by using mobile devices, etc.

Therefore, there is a need for a new technology and apparatus for operating an unmanned store that can increase user convenience and sales rate in an unmanned store or vending machine and utilize artificial intelligence technology by using the above-described technologies.

DISCLOSURE

Technical Problem

An object of the present invention is to provide an unmanned store system using an artificial intelligence-based smart vending machine.

Another object of the present invention is to provide an unmanned store apparatus and system that can determine a price and marketing target for a product for sale based on inventory-related information and nearby user information, thereby automatically and efficiently performing inventory management and efficiently utilizing a limited physical space.

Another object of the present invention is to provide a more convenient GRIP AND GO experience by automatically detecting a picking-up motion of a user using a plurality of cameras and performing user authentication through the recognition of the face of the user.

Another object of the present invention is to provide an noncontact store that enables contact costs to be reduced and a product purchase to be conveniently completed using a mobile device of a user and an unmanned smart vending machine.

Another object of the present invention is to provide a method and system that can determine a price in real time by utilizing user information located near an unmanned store apparatus, thereby enabling active marketing and inventory management based on a location and surrounding circumstances The technical problems to be solved by the present invention are not limited to the above-described problems, and other technical problems that have not been described above will be clearly understood by those skilled in the art from the following description.

Technical Solution

According to an embodiment of the present invention, there is provided an unmanned store operation method of operating an unmanned store system including an unmanned store apparatus and an unmanned store server, the unmanned store operation method including: a user identification step of identifying a user adjacent to the unmanned store apparatus; a door opening step of unlocking the door of the unmanned store apparatus by controlling a door unit of the unmanned store apparatus; a purchase target product identification step of identifying a product selected by the user and removed from the product storage unit of the unmanned store apparatus based on the analysis of an image photographed by a camera unit; and a payment processing step of processing payment based on the identification information of the user.

In this case, the user identification step may include: transmitting a wireless signal from the unmanned store apparatus to a mobile device of the user; determining whether the strength of a wireless signal is equal to or higher than a predetermined reference in the mobile device of the user; and performing user authentication by transmitting identification information related to the user to the server when the strength of the wireless signal is equal to or higher than the predetermined reference.

Furthermore, the unmanned store operation method may further include activating an unlock button configured to unlock the door of the unmanned store apparatus in the mobile device of the user when the strength of the wireless signal is equal to or higher than the predetermined reference.

Furthermore, the user identification step may further include performing user authentication based on an image of the face of the user photographed by the camera unit of the unmanned store apparatus.

Furthermore, the user identification step may further include determining whether the user has an administration authority based on the identification information of the user, and the unmanned store operation method may include updating inventory information based on information about a product added to the product storage unit when the user has administration authority.

Furthermore, the user identification step may further include, when there is a plurality of mobile devices that have received the wireless signal from the unmanned store apparatus, activating only a mobile device having the highest received wireless signal strength among the plurality of mobile devices.

Furthermore, the purchase target product identification step may include: acquiring images photographed by at least four cameras installed on the top, bottom, left, and right of the interior of the unmanned store apparatus; and, when the product selected by the user cannot be identified due to an occluded area covered by the user in at least one of the four photographed images, identifying the product selected by the user and removed from the product storage unit based on the remaining photographed images.

Furthermore, the purchase product identification step may include identifying the product selected by the user and removed from the product storage unit based on a measured value of a weight sensor installed in the product storage unit in addition to the analysis of the image photographed by the camera unit.

Furthermore, the unmanned store operation method may further include updating the price information in real time in a display unit configured to display the price information of each product displayed in the product storage unit.

Furthermore, the discount rate of the price information may be determined based on the number of stocks of the corresponding product, an expiration date, and the number of users who have installed an unmanned store apparatus-related app and are located within a predetermined reference from a location at which the unmanned store apparatus is present.

Furthermore, the price information may be determined based on the frequency of persons, passing through a space in which the unmanned store apparatus is installed, via images photographed by a camera of the unmanned store apparatus.

Furthermore, the unmanned store operation method may further include: recognizing a product held or touched by the user; and displaying information related to the recognized product on at least a partial area of the display unit.

Furthermore, the unmanned store operation method may further include changing product information advertised in at least a partial area of the display unit based on at least one of the number of stocks, expiration date, and time interval of a corresponding product.

Furthermore, the unmanned store operation method may further include notifying at least some of users, who have installed an unmanned store apparatus-related app and are located within a predetermined reference from a location at which the unmanned store apparatus is present, of the price information determined based on the discount rate.

According to another embodiment of the present invention, there is provided an unmanned store system including an unmanned store apparatus and an unmanned store server, the unmanned store system including: a user identification unit configured to identify a user adjacent to the unmanned store apparatus; a door unit configured to be controlled to lock or unlock the door of the unmanned store apparatus; a camera unit including at least one camera installed in the unmanned store apparatus; a purchase product identification unit configured to identify a product selected by the user and removed from the product storage unit of the unmanned store apparatus based on the analysis of an image photographed by the camera unit; and a payment processing unit configured to process payment based on the identification information of the user.

Furthermore, the user identification unit may be configured to perform user authentication based on an image of the face of the user photographed by the camera unit of the unmanned store apparatus.

Furthermore, the user identification unit may be configured to determine whether the user has an administration authority based on the identification information of the user, and the unmanned store system may further include an inventory information processing unit configured to update inventory information based on information about a product added to the product storage unit when the user has administration authority.

Furthermore, the unmanned store system may further include a communication unit configured to transmit a wireless signal from the unmanned store apparatus to a mobile device of the user, and the user identification unit may be configured to, when there is a plurality of mobile devices that have received the wireless signal from the unmanned store apparatus, activate only a mobile device having the highest received wireless signal strength among the plurality of mobile devices.

Furthermore, the camera unit may include at least four cameras installed on the top, bottom, left, and right of the interior of the unmanned store apparatus, and the purchase product identification unit may be configured to acquire images photographed by the at least four cameras installed on the top, bottom, left, and right of the interior of the unmanned store apparatus and to, when the product selected by the user cannot be identified due to an occluded area covered by the user in at least one of the four photographed images, identify the product selected by the user and removed from the product storage unit based on the remaining photographed images.

Furthermore, the unmanned store system may further include a display unit configured to display the price information of each product displayed in the product storage unit, and the price information may be updated in real time.

Furthermore, the discount rate of the price information may be determined based on the number of stocks of the corresponding product, an expiration date, and the number of users who have installed an unmanned store apparatus-related app and are located within a predetermined reference from a location at which the unmanned store apparatus is present.

Moreover, the price information may be determined based on the frequency of persons, passing through a space in which the unmanned store apparatus is installed, via images photographed by a camera of the unmanned store apparatus.

Advantageous Effects

According to the present invention, there may be provided the unmanned store system using an artificial intelligence-based smart vending machine.

Furthermore, according to the present invention, there may be provided the unmanned store apparatus and system that can determine a price and marketing target for a product for sale based on inventory-related information and nearby user information, thereby automatically and efficiently performing inventory management and efficiently utilizing a limited physical space.

Furthermore, according to the present invention, there may be provided a more convenient GRIP AND GO experience by automatically detecting a picking up motion of a user using a plurality of cameras and performing user authentication through the recognition of the face of the user.

Furthermore, according to the present invention, there may be provided the noncontact store that enables contact costs to be reduced and a product purchase to be conveniently completed using a mobile device of a user and an unmanned smart vending machine.

Furthermore, according to the present invention, there may be provided the method and system that can determine a price in real time by utilizing user information located near an unmanned store apparatus, thereby enabling active marketing and inventory management based on a location and surrounding circumstances The effects of the present invention are not limited to the above-described effects, and other effects that have not been described above will be clearly understood by those skilled in the art in the art from the following description.

DESCRIPTION OF DRAWINGS

FIG. 4 is a flowchart illustrating a method of operating an unmanned store system according to an embodiment of the present invention;

FIG. 5 is a flowchart illustrating a method of operating an unmanned store system according to another embodiment of the present invention;

FIG. 6 is an exemplary diagram illustrating a method of recognizing an active user when a plurality of users is present according to an embodiment of the present invention;

FIG. 7 is an exemplary diagram illustrating a method for determining a discount rate for a product according to an embodiment of the present invention.

MODE FOR INVENTION

The present invention will be described in detail below with reference to the accompanying drawings so that those skilled in the art can easily practice the present invention. However, the present invention may be embodied in various different forms and is not limited to the embodiments described herein.

The terms used herein are intended to describe the embodiments and are not intended to limit the present invention. In this specification, a singular form also includes a plural form unless specifically stated otherwise in a phrase.

As used herein, the terms "comprise" and "comprising" do not exclude the presence or addition of one or more components, steps, operations, and/or elements other than one or more mentioned components, steps, operations, and/ or elements.

Furthermore, the terms including an ordinal number such as first, second, or the like used herein may be used to describe components, but the components should not be limited by the terms. These terms are used only for the purpose of distinguishing one component from another. Furthermore, in the description of the present invention, when it is determined that a detailed description of a related known technology may obscure the gist of the present invention, the detailed description thereof will be omitted.

Moreover, components appearing in each embodiment of the present invention are shown independently of each other to represent different characteristic functions, and this does not mean that each component is composed of separate hardware or a single software unit. In other words, individual components are listed as respective components for convenience of description. At least two of the individual components may be combined into a single component, or one component may be divided into a plurality of components and perform a function. An embodiment in which some components are combined together and an embodiment in which some components are divided are also included in the scope of the present invention as long as they do not depart from the gist of the present invention.

Embodiments according to the present invention will be described in detail with reference to the accompanying drawings below. The configuration of the present invention and the operating effects thereof will be clearly understood through the following detailed description.

Figure 1:
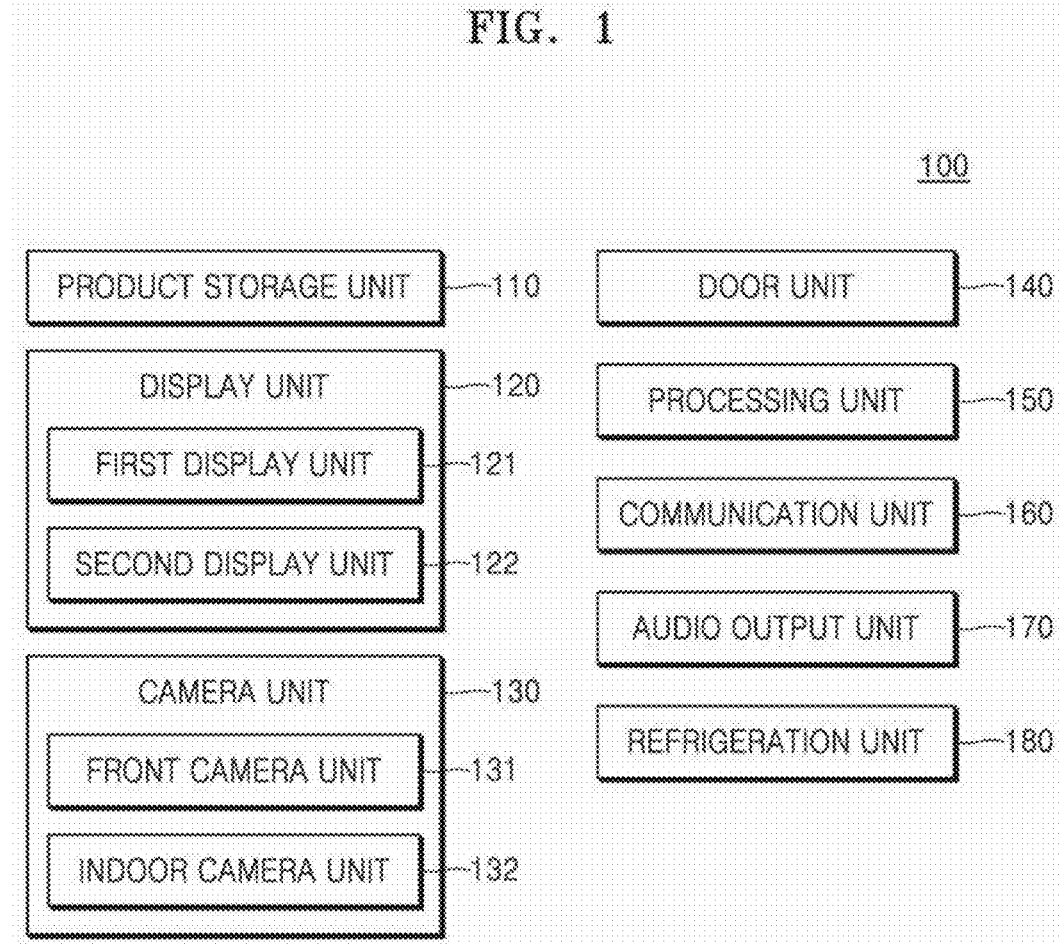
FIG. 1 is a block diagram illustrating the configuration of an unmanned store apparatus according to an embodiment of the present invention.

FIG. 1 is a block diagram illustrating the configuration of an unmanned store apparatus according to an embodiment of the present invention.

Referring to FIG. 1, the unmanned store apparatus 100 may include a product storage unit 110, a display unit. 120, a camera unit 130, a door unit 140, a processing unit 150, a communication unit 160, an audio output unit 170, and a refrigeration unit 180. Some components may be omitted or other components may be added according to needs and functions.

The product storage unit 110 may be composed of pluralities of layers and rows and columns to store and display various products. For example, the product storage unit 110 may have a shelf form in which the arrangement interval of the layers or the rows and columns can be adjusted according to the type, packaging state, and size of products. It is sufficient if the product storage unit 110 can display a variety of products, and the product storage unit 110 is not limited to these shapes.

The display unit 120 may be configured to display product-related information including price information and event information, user-related information, payment information, and the like. The display unit 120 may be, e.g., any one of a liquid crystal display (LCD), a light emitting diode (LED) display, an organic light emitting diode (OLED) display, a micro LED, a microelectromechanical system (MEMS) display, and an electronic paper display. The display unit 120 may be configured in various forms such as a transparent display or a touch screen, but is not limited thereto.

More specifically, the display unit 120 may include: a first display unit 121 that may be located at the top of the unmanned store apparatus 100 to provide specific product information such as a product description, and user delivery information to be delivered to the user such as a product discount event; and a second display unit 122 that may be located adjacent to the product storage unit 110 in order to provide the price and simple information of each product for sale.

The camera unit 130 includes: a front camera unit 131 located on the front of the unmanned store apparatus 100 in order to photograph the face of a user positioned in front of the unmanned store apparatus 100 or users passing by the front of the unmanned store apparatus 100; and an indoor camera unit 132 located inside the unmanned store apparatus 100 in order to photograph various actions in which a user grabs, grips, touches, and moves to purchase a product. In this case, the front camera unit 131 and the indoor camera unit 132 may include small-sized cameras or various sensors, and may include depth cameras such as stereo cameras for distance measurement.

Furthermore, the indoor camera unit 132 may include, e.g., at least four cameras installed on the top, bottom, left, and right of the unmanned store apparatus 100. In the case where images photographed in the vertical, horizontal, and horizontal directions are used as described above, when a product selected by a user cannot be identified due to an occluded area covered by the user in at least one of the images photographed in the four directions, a product selected by the user and removed from the product storage unit 110 may be identified based on the rest of the photographed images that are not covered by the user. For example, when the user holds a product from a right side using the right hand, most of the right area of the product held by the user is covered by the user's hand, so that it is not possible to clearly determine whether the product has been selected from the image photographed by the right camera. However, in the images photographed by the cameras, e.g., the left camera or the upper and lower cameras, in other directions, the gripped product appears together with the user's hand, so that the selected and gripped product can be identified. As described above, the product held by the user may be more accurately identified using the images photographed from the plurality of directions in a complex manner.

Furthermore, a product removed from the product storage unit because a user selects and holds the product may be more accurately identified utilizing a weight sensor installed in the product storage unit 110 as well as image recognition information obtained through the indoor camera unit 132.

The door unit 140 may be present on the front of the unmanned store apparatus 100 and be configured in various forms such as an opening/closing form or a slide form configured to protect internal products, and may be made of transparent glass, or the like. The door unit 140 may be controlled to be automatically unlocked and opened according to user authentication, and may be controlled to be automatically locked and closed after the purchase of a product has been completed.

The processing unit 150 is configured to perform various types of processing related to the processing of data communication with a server, operation control according to a command received from the server, the processing of data communication with a user terminal, the processing of information to be displayed on the display unit 120, the processing of an image photographed by the camera unit 130, the recognition of user actions, payment processing, etc. For example, the processing unit 150 may include a central processing unit. (CPU), an application processor (AP), and the like, and may include memory capable of storing instructions or data related to at least one other component therein, or access required information through communication with a memory unit within the device or with an external memory when necessary. The more detailed configuration of the processing unit 150 will be described later with reference to FIG. 2.

The communication unit 160 is configured to transmit/receive necessary information from a user device such as a server or a mobile smartphone for operating an unmanned store or to transmit acquired information to an external server or an external user device. In this case, the network may be a network connected over a wired or wirelessly connection.

In this case, the network may be a high-speed backbone network of a large-scale communication network capable of providing high capacity and long-distance voice and data service, and may include the Internet or a next-generation wired network and wireless network for providing high-speed multimedia service. When the network is a wireless communication network, it may include cellular communication or short-range communication. For example, the cellular communication may include at least one of Long-Term Evolution (LTE), LTE Advanced (LTE-A), 5th Generation (5G), Code Division Multiple Access (CDMA), Wideband CDMA (WCDMA), Universal Mobile Telecommunications System (UMTS), Wireless Broadband (WiBro), and Global System for Mobile Communications (GSM). In addition, the short-range communication may include at least one of Wireless Fidelity (Wi-Fi), Bluetooth, Zigbee, and Near Field Communication (NFC). However, the communication method is not limited thereto, and will include wireless communication technology to be developed later.

The audio output unit 170 may provide an alarm, notification, or a sound effect to the user in the form of sound, and may be configured to output information about a product for sale or payment-related information as a notification sound. The audio output unit 170 may also inform the user of necessary information in conjunction with the display unit 120.

Finally, when products in the unmanned store apparatus 100 include, e.g., a beverage, fresh food, etc., the refrigerating unit 180 may maintain refrigeration by lowering the temperature of the products. If necessary, the power of the refrigerating unit 180 may be turned on or off.

Figure 2:
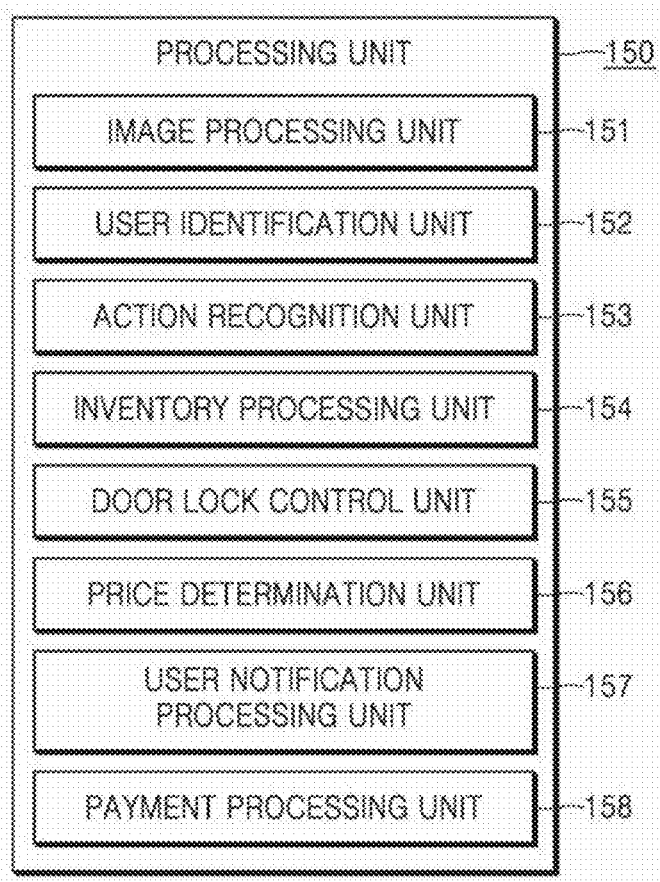
FIG. 2 is a block diagram illustrating the detailed configuration of the processing unit of an unmanned store apparatus or an unmanned store server according to an embodiment of the present invention.

FIG. 2 is a block diagram illustrating the detailed configuration of the processing unit of an unmanned store apparatus or an unmanned store server according to an embodiment of the present invention.

According to an embodiment, the processing unit 150 may include an image processing unit 151, a user identification unit 152, an action recognition unit 153, an inventory processing unit 154, a door lock control unit 155, a price determination unit 156, a user notification processing unit 157, and a payment processing unit 158. Some components of the processing unit 150 may be located in either or both the unmanned store apparatus 100 or/and the unmanned store server 200. The processing unit of the unmanned store apparatus 100 may be configured to receive a result processed by the processing unit of the unmanned store server 200 and to control the unmanned store apparatus 100 or perform output. The program or program modules included in the processing unit 150 may be configured in the form of an operating system, an application program, or a program, and may be physically stored in various types of widely used storage devices. Such program or program modules may include various forms for performing one or more routines, subroutines, programs, objects, components, instructions, data structures, and specific tasks or executing a specific data type, but are not limited to these forms.

First, the image processing unit 151 includes an image processor configured to process and analyze an image photographed by the camera unit 130. In this case, a processed image recognition result may be utilized in the user identification unit 152 and the action recognition unit 153.

The user identification unit 152 may be configured to identify a user present in front thereof or adjacent thereto through face recognition via the front camera unit 131 of the unmanned store apparatus 100 and to perform user authentication. Furthermore, the user identification unit 152 may determine the frequency of moving persons by identifying persons passing through a space, in which the unmanned store apparatus 100 is installed, via images photographed by the front camera unit 131.

In addition, the user identification unit 152 may be configured to transmit a wireless signal such as a Bluetooth signal from the unmanned store apparatus 100 to the user mobile device, to determine whether the strength of the wireless signal is equal to or higher than a predetermined reference value in the user mobile device, and to, when the strength of the wireless signal is equal to or higher than the predetermined reference value, perform user authentication by transmitting identification information related to the user to the unmanned store server 300. Furthermore, the user identification unit 152 may be configured to activate an unlock button for unlocking the door of the unmanned store apparatus 100 in the corresponding user mobile device when the strength of the wireless signal is equal to or higher than the predetermined reference value. In this case, the wireless signal may include not only a Bluetooth signal, but also a signal used in indoor measurement technology, such as a Wi-Fi signal, a magnetometer signal, and a fusion sensor signal.

Furthermore, the user identification unit 152 may be configured to, when a wireless signal such as a Bluetooth signal is transmitted from the unmanned store apparatus 100 to a plurality of user mobile devices, activate only a mobile device having the highest wireless signal strength among the plurality of user mobile devices. In this case, only a single user may be informed of the availability of the unmanned store apparatus 100 by activating the unlock button only in the corresponding mobile device.

Furthermore, the user identification unit 152 is configured to determine whether the user is an administrator with administrative authority or a general customer based on the identification information of the user. When the identified user has administration authority, inventory information may be updated through the inventory processing unit 154 based on information about products added to and filled in the product storage unit 110.

The action recognition unit 153 may be configured to recognize a product, removed from the product storage unit 110 and paid for because the user selects, holds, and moves it, by recognizing various actions in which the user holds, grips, touches, and moves the product for the purpose of purchasing the product.

Furthermore, the action recognition unit 153 may use an image processing method having occlusion resistance in order to clearly recognize a product purchased by the user. In the case where images photographed by the indoor camera unit 132 in up, down, left and right directions are used, when a product selected by the user cannot be identified due to an occluded area covered by the user in at least one of the images photographed in the four directions, the product selected by the user and removed from the product storage unit 110 may be accurately identified based on the rest of the photographed images that are not covered by the user. For example, even when the user covers some area of a product with his/her hand, the product held by the user may be clearly identified through the recognition of images photographed by cameras in directions that are not covered by the user. In this case, it may be possible to use artificial intelligence-based recognition technology by learning conventional data.

Furthermore, the action recognition unit 153 may be configured to recognize a product, removed from the product storage unit because it has been selected and gripped by the user, by using a measured value of the weight sensor installed in the product storage unit 110 as well as the image recognition information acquired through the indoor camera unit 132.

Furthermore, when a product held or touched by the user is recognized via the action recognition unit 153, information related to the recognized product may be displayed on a partial area of the display unit 120. Accordingly, the user can check related information through a touch on the corresponding product, thereby helping to make a purchase decision.

The inventory processing unit 154 is configured to reflect inventory information by recognizing the types and recognition of one or more products purchased by the user and to update the inventory information by recognizing the types and recognition of one or more products filled by the administrator. Such inventory information may be utilized for the price determination of the price determination unit 156.

The door lock control unit 155 may be configured to control the unlocking or locking of the door of the door unit 140 based on user authentication and product purchase completion determination.

The price determination unit 156 may be configured to generate price-related information, including a discount rate determined based on the number of stocks of a corresponding product, an expiration date, a time interval, and the number of users who have installed the unmanned store apparatus-related app and are located within a predetermined reference from a location where the unmanned store apparatus is present. In this case, the predetermined reference may determine a user in the same building, or may be set to a predetermined distance such as 50 m or 100 m. In this case, the determination of the price may be performed by learning the conventional data and using artificial intelligence-based technology. In addition, weight information may be additionally reflected in the number of app installation users by taking into consideration information such as the pre-stored purchase histories and preferred products of the app users.

Furthermore, the price information may be determined by additionally reflecting the frequency of persons passing through a space, in which the unmanned store apparatus 100 is installed, based on images photographed by the front camera unit 131. The frequency of persons around the unmanned store apparatus 100 may indicate the number of prospective customers. Accordingly, even in the case of persons who do not install the unmanned store apparatus-related app, it may be determined that when the frequency of nearby movements of persons is high, the potential of prospective customers to purchase the product will increase.

Furthermore, the price information of each product that is changed in real time by the price determination unit 156 may be displayed on the display unit 120, and may provide real-time updated information to the user.

Furthermore, for example, a product with a high discount rate is advertised in at least a partial area of the display unit 120 based on at least one of the number of stocks, expiration date, and time interval of a corresponding product, so that an advertisement effect may be enhanced by performing control so that a target to be advertised can be automatically changed in real time according to a change in discount rate or price.

The user notification processing unit 157 may be configured to provide notification of the price information determined based on the discount rate to at least some of the users who have installed the unmanned store apparatus-related app and are located within the predetermined reference from the location where the unmanned store apparatus 100 is present. The selection of the users who will receive the notification may be determined by taking into consideration whether the location of a corresponding user, e.g., the building in which the current user is located, is the same as the building in which the unmanned store apparatus 100 is present, and may also be determined by taking into consideration the preference of the user, e.g., whether a notified product is a product preferred by the user or a product included in a purchase history in a comprehensive manner.

Finally, the payment processing unit 158 may be configured to process the payment of the purchased product based on the identification information of the user. In this case, various payment methods such as information set in a corresponding app, general credit card payment, or mobile payment may be used as a payment method.

Figure 3A:
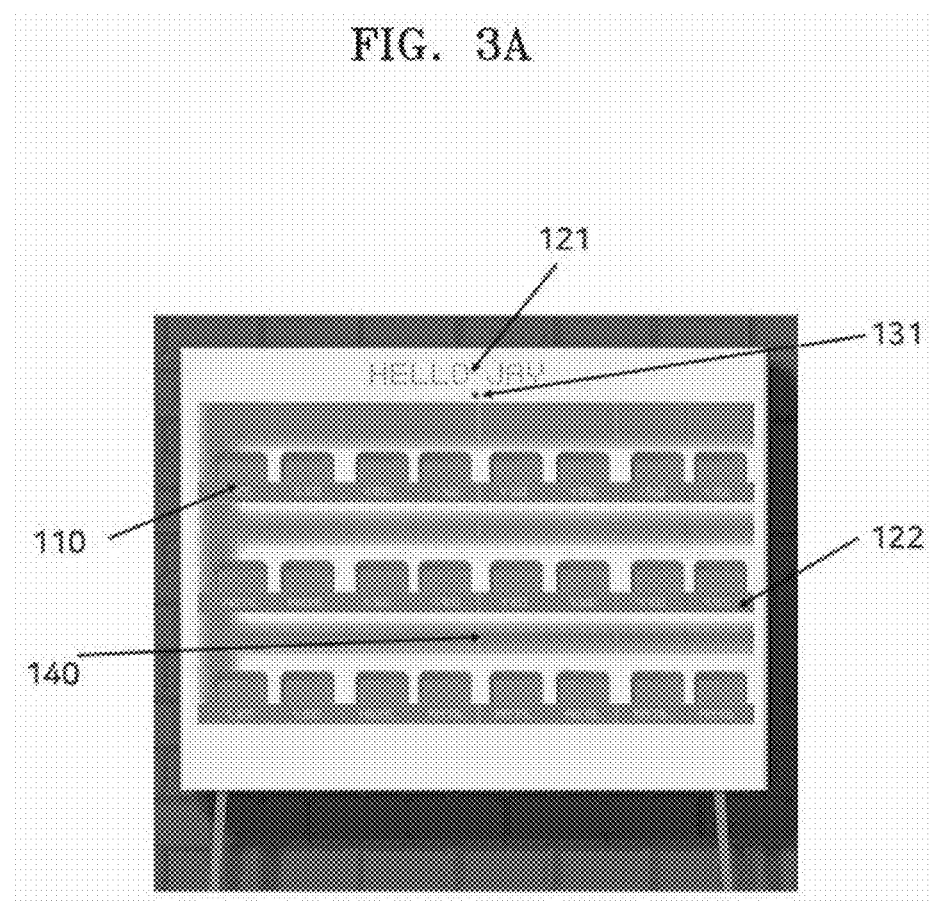
FIGS. 3a and 3b are exemplary views illustrating the configuration of an unmanned store apparatus according to an embodiment of the present invention.
Figure 3B:
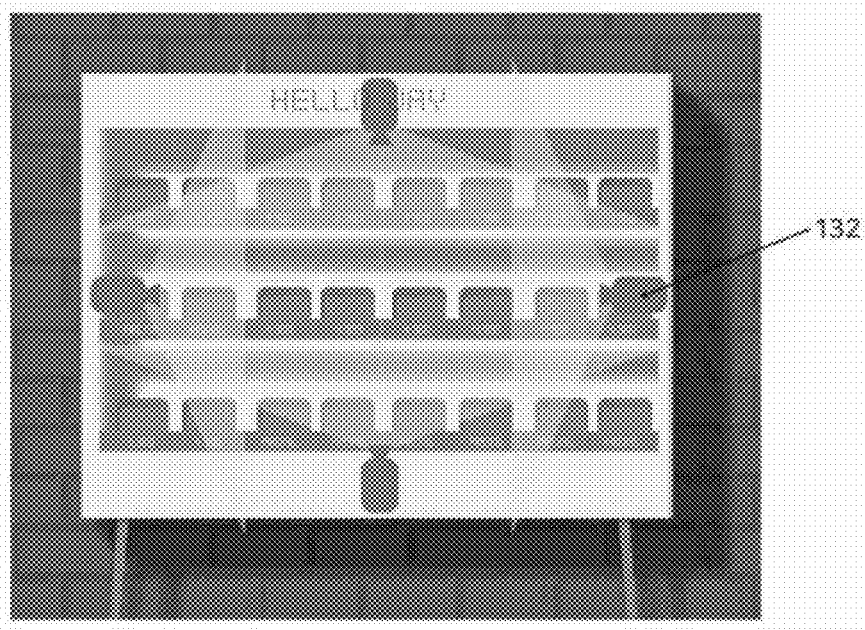

FIGS. 3a and 3b are exemplary views illustrating the configuration of the unmanned store apparatus according to the embodiment of the present invention.

Referring to FIG. 3a, the first display unit 121 may be located at the top of the front of the unmanned store apparatus 100, and may display not only the specific information of a product or merchandise for sale but also user delivery information to be delivered to the user, such as greetings to the user and a product discount event. Various products may be displayed in the product storage unit 110, and the second display unit 122 capable of displaying the price and simple product information of each product may be located adjacent to the product storage unit 110.

Furthermore, the front camera unit 131 may be located at the top of the front of the unmanned store apparatus 100, and may acquire an image of a user located in front of or adjacent to the unmanned store apparatus 100. Furthermore, internal products may be protected through the door unit 140, and the door may be opened or closed through the control of the unlocking or locking of the door based on user authentication.

Referring to FIG. 3b, there may be installed the indoor camera unit 132 including, e.g., cameras on the top, bottom, left, and right of the unmanned store apparatus 100. When a product selected by the user cannot be identified due to an occluded area covered by the user in at least one of the images photographed in the four directions through the images acquired in the four directions as described above, a product that is selected by the user and removed from the product storage unit 110 may be accurately identified based on the rest of the photographed images that are not covered.

FIG. 4 is a flowchart illustrating a method of operating an unmanned store system according to an embodiment of the present invention. FIG. 4 illustrates an activation method via an unlock button activated in an app of a user as an example.

First, the unmanned store apparatus 100 generates a Bluetooth signal to periodically recognize whether the distance between a store and a mobile device of the user is close at step S401.

The user terminal 200, which may be a mobile device of a customer, transmits a user ID and an unmanned store apparatus ID having generated the Bluetooth signal to the unmanned store server 300 through the corresponding app when the strength of the Bluetooth signal is equal to or higher than a predetermined reference value at step 3402. Through the above configuration, a product purchase process may be activated only when the user is away from the unmanned store apparatus 100 by a specific distance or less.

After checking the received user ID and unmanned store apparatus ID, the unmanned store server 300 may transmit a signal intended to activate the unlock button to the user terminal 200 at step S403.

The unlock button may be activated through the app in the user terminal 200 at step S404, and the user may complete authentication by pressing the unlock button through an operation such as a touch at step S405.

Accordingly, the user ID may be transmitted from the unmanned store server 300 to the unmanned store apparatus 100 at step S406, and a front glass window or the like may be opened by unlocking the door of the unmanned store apparatus 100 at step S407.

The user may select and hold a product to be purchased through the opened door, and at this time, the indoor cameras disposed on the top, bottom, left and right of the interior of the unmanned store apparatus 100 may be activated and track a user action and recognize the product to be purchased at step S408.

If a user action is not recognized for a predetermined period or more, it may be determined that the purchase of the product is terminated or abandoned, and thus the door may be locked and automatically closed at step S409.

Information about the product photographed by the user may be transmitted to the server at step S410, and the unmanned store server 300 may process payment for the product determined to be purchased by the user after a preset time and transmit payment information to the user terminal at step S410. If it is determined that the user has placed the corresponding product on the product storage unit 110 again, the payment for the product may be canceled and refunded.

The payment information may be displayed on the user terminal 200 at step S412, and thus the user may check whether the payment has been made correctly.

FIG. 5 is a flowchart illustrating a method of operating an unmanned store system according to another embodiment of the present invention. FIG. 5 illustrates a method of unlocking and opening a door based on the recognition of the face of a user as an example.

First, the unmanned store apparatus 100 generates a Bluetooth signal to periodically recognize whether the distance between a store and a mobile device of the user is close at step S501.

The user terminal 200 transmits a user ID and an unmanned store apparatus ID having generated the Bluetooth signal to the unmanned store server 300 through a corresponding app when the strength of the Bluetooth signal is equal to or higher than a predetermined reference value at step S502. Through the above configuration, a product purchase process may be activated only when the user is away from the unmanned store apparatus 100 by a specific distance or less.

At step S503, after checking the received user ID and unmanned store apparatus ID, the unmanned store server 300 may transmit a face recognition command to the unmanned store apparatus 100 when the user ID is the ID of a customer whose face information has been stored.

The face of the user may be photographed using the front camera unit 131 of the unmanned store apparatus 100 and the photographed image may be transmitted to the unmanned store server 300 at step S504.

When the face information is correctly matched in the unmanned store server 300, an unlock command may be transmitted to the unmanned store apparatus 100 at step S505.

Accordingly, the unmanned store apparatus 100 may receive the unlock command and open the door at step S506.

The user may select and hold a product to be purchased through the opened door, and at this time, the indoor cameras disposed on the top, bottom, left and right of the interior of the unmanned store apparatus 100 may be activated and may track a user action and recognize the product to be purchased at step S507.

If an action of the user has not been recognized for a predetermined period, it may be determined that the purchase of the product is terminated or abandoned, and the door may be locked and automatically closed at step S508.

Information about the product photographed by the user may be transmitted to the server at step S509, and the unmanned store server 300 may process payment for the product determined to be purchased by the user after a preset time and transfer payment information to the user terminal at step S510.

The payment information may be displayed on the user terminal 200 at S511, and thus the user may check whether the payment has been made correctly.

FIG. 6 is an exemplary diagram illustrating a method of recognizing an active user when a plurality of users is present according to an embodiment of the present invention.

When a plurality of users uses the unmanned store apparatus 100 at the same time, an error in each purchased product or payment process may occur, so that it is necessary to make a setting so that the unmanned store apparatus 100 is occupied by only one user in the same time span.

Referring to FIG. 6, when a wireless signal such as a Bluetooth signal is generated and transmitted from the unmanned store apparatus 100, all three nearby users 201, 202, and 203 may receive the Bluetooth signal. In this case, each of the users 201, 202, and 203 may transmit a received signal level to the unmanned store server 300. The unmanned store server 300 may determine that the signal level of the user 201 is 28, the signal level of the user 202 is 18, and the signal level of the user 203 is 9, and may perform control so that only the user 201 having the highest signal level can use the unmanned store apparatus 100.

For example, the unlock button configured to unlock the door of the unmanned store apparatus 100 may be activated only in the mobile device of the user 201 having the highest signal level, thereby prompting the nearest user 201 to use the unmanned store apparatus 100 first.

FIG. 7 is an exemplary diagram illustrating a method for determining a discount rate for a product according to an embodiment of the present invention.

Referring to FIG. 7, for each product, i.e., each of product A, product B, and product C, the discount rate for the product may be determined by taking into consideration the number of stocks, an expiration date, the number of valid customers set based on the number of users who have installed the app within a preset reference, and the number of prospective customers recognized by the front camera and set based on the frequency of customers moving around, regardless of whether they have installed the app.

In this case, in the case of product A, which has a imminent expiration date and also has relatively large numbers of nearby valid customers and prospective customers, no discount is applied. In the case of product B, which has a significantly imminent expiration date and also has a relatively small number of valid customers or prospective customers, a discount rate of 40% may be applied to sell stock products rapidly.

Figure 8A:
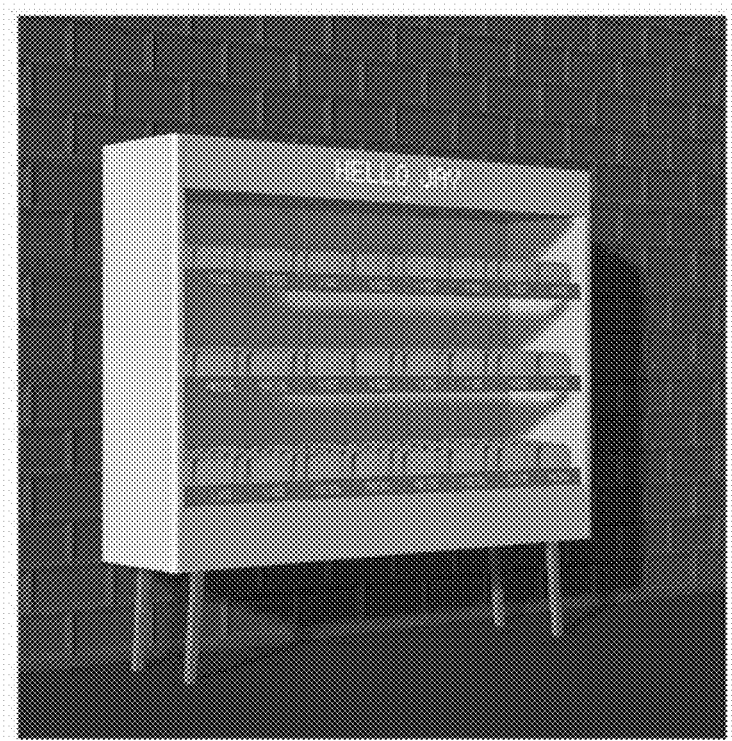
FIGS. 8a and 8b are exemplary views illustrating the appearance of an unmanned store apparatus according to an embodiment of the present invention.
Figure 8B:
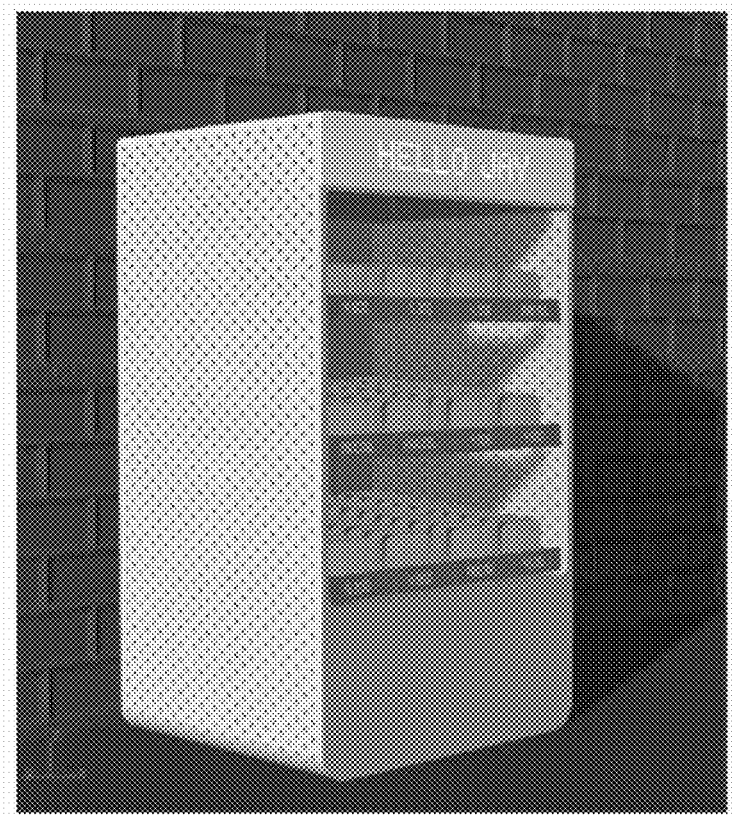

FIGS. 8a and 8b are exemplary views illustrating the appearance of an unmanned store apparatus according to an embodiment of the present invention.

Referring to FIGS. 8a and 8b, it can be understood that the unmanned store apparatus may be configured to have a vending machine having various shapes and appearances as necessary.

Although the method of operating an unmanned store and unmanned store system according to the embodiments of the present invention have been described as various specific embodiments, this is merely an example. The present invention is not limited thereto, and should be construed as having the widest scope according to the basic spirit disclosed herein. Those skilled in the art may implement a pattern of a shape not specified by combining or substituting the disclosed embodiments, but this also does not depart from the scope of the present invention. In addition, those skilled in the art may easily change or modify the embodiments disclosed based on the present specification, and it is obvious that such changes or modifications also fall within the scope of the present invention.

The invention claimed is:

1. An unmanned store operation method of operating an unmanned store system including an unmanned store apparatus and an unmanned store server, the unmanned store operation method comprising:
    a user identification step of identifying a user adjacent to the unmanned store apparatus;
    a door opening step of unlocking a door of the unmanned store apparatus by controlling a door unit of the unmanned store apparatus;
    a purchase target product identification step of identifying a product selected by the user and removed from a product storage unit of the unmanned store apparatus based on analysis of an image photographed by a camera unit;
    a payment processing step of processing payment based on identification information of the user, and
    an updating step of updating price information in real time in a display unit configured to display the price information of each product displayed in the product storage unit,
    wherein the price information is determined based on a discount rate,
    wherein the discount rate is determined based on a number of stocks of the corresponding product, an expiration date, a number of valid customers determined based on a number of users who have installed an unmanned store apparatus-related app and are located within a predetermined reference from a location at which the unmanned store apparatus is present, and a number of prospective customers determined based on a frequency of persons around the unmanned store apparatus, and
    the persons around the unmanned store apparatus include persons who do not have installed the unmanned store apparatus-related app.

2. The unmanned store operation method of claim 1, wherein the user identification step comprises:
    transmitting a wireless signal from the unmanned store apparatus to a mobile device of the user;
    determining whether a strength of a wireless signal is equal to or higher than a predetermined reference in the mobile device of the user; and
    performing user authentication by transmitting identification information related to the user to the server when the strength of the wireless signal is equal to or higher than the predetermined reference.

3. The unmanned store operation method of claim 2, further comprising activating an unlock button configured to unlock the door of the unmanned store apparatus in the mobile device of the user when the strength of the wireless signal is equal to or higher than the predetermined reference.

4. The unmanned store operation method of claim 2, wherein the user identification step further comprises performing user authentication based on an image of a face of the user photographed by the camera unit of the unmanned store apparatus.

5. The unmanned store operation method of claim 1, wherein the user identification step further comprises determining whether the user has an administration authority based on the identification information of the user; and the unmanned store operation method comprises updating inventory information based on information about a product added to the product storage unit when the user has administration authority.

6. The unmanned store operation method of claim 2, wherein the user identification step further comprises, when there is a plurality of mobile devices that have received the wireless signal from the unmanned store apparatus, activating only a mobile device having a highest received wireless signal strength among the plurality of mobile devices.

7. The unmanned store operation method of claim 1, wherein the purchase target product identification step comprises:
   acquiring images photographed by at least four cameras installed on a top, bottom, left, and right of an interior of the unmanned store apparatus; and
   when the product selected by the user cannot be identified due to an occluded area covered by the user in at least one of the four photographed images, identifying the product selected by the user and removed from the product storage unit based on remaining photographed images.

8. The unmanned store operation method of claim 1, wherein the purchase product identification step comprises identifying the product selected by the user and removed from the product storage unit based on a measured value of a weight sensor installed in the product storage unit in addition to the analysis of the image photographed by the camera unit.

9. The unmanned store operation method of claim 1, further comprising:
   recognizing a product held or touched by the user; and
   displaying information related to the recognized product on at least a partial area of the display unit.

10. The unmanned store operation method of claim 1, further comprising changing product information advertised in at least a partial area of the display unit based on at least one of a number of stocks, expiration date, and time interval of a corresponding product.

11. The unmanned store operation method of claim 1, further comprising notifying at least some of users, who have installed an unmanned store apparatus-related app and are located within a predetermined reference from a location at which the unmanned store apparatus is present, of the price information determined based on the discount rate.

12. An unmanned store system including an unmanned store apparatus and an unmanned store server, the unmanned store system comprising:
   a user identification unit configured to identify a user adjacent to the unmanned store apparatus;
   a door unit configured to be controlled to lock or unlock a door of the unmanned store apparatus;
   a camera unit including at least one camera installed in the unmanned store apparatus;
   a purchase product identification unit configured to identify a product selected by the user and removed from a product storage unit of the unmanned store apparatus based on analysis of an image photographed by the camera unit;
   a payment processing unit configured to process payment based on identification information of the user; and
   a display unit configured to display price information of each product displayed in the product storage unit,
   wherein the price information is updated in real time,
   wherein the price information is determined based on a discount rate,
   wherein the discount rate is determined based on a number of stocks of the corresponding product, an expiration date, a number of valid customers determined based on a number of users who have installed an unmanned store apparatus-related app and are located within a predetermined reference from a location at which the unmanned store apparatus is present, and a number of prospective customers determined based on a frequency of persons around the unmanned store apparatus, and
   the persons around the unmanned store apparatus include persons who do not have installed the unmanned store apparatus-related app.

13. The unmanned store system of claim 12, wherein the user identification unit is configured to perform user authentication based on an image of a face of the user photographed by the camera unit of the unmanned store apparatus.

14. The unmanned store system of claim 12, wherein the user identification unit is configured to determine whether the user has an administration authority based on the identification information of the user; and
   the unmanned store system further comprises an inventory information processing unit configured to update inventory information based on information about a product added to the product storage unit when the user has administration authority.

15. The unmanned store system of claim 12, further comprising a communication unit configured to transmit a wireless signal from the unmanned store apparatus to a mobile device of the user;
   wherein the user identification unit is configured to, when there is a plurality of mobile devices that have received the wireless signal from the unmanned store apparatus, activate only a mobile device having a highest received wireless signal strength among the plurality of mobile devices.

16. The unmanned store system of claim 12, wherein the camera unit comprises at least four cameras installed on a top, bottom, left, and right of an interior of the unmanned store apparatus; and
   the purchase product identification unit is configured to acquire images photographed by the at least four cameras installed on the top, bottom, left, and right of the interior of the unmanned store apparatus and to, when the product selected by the user cannot be identified due to an occluded area covered by the user in at least one of the four photographed images, identify the product selected by the user and removed from the product storage unit based on remaining photographed images.

* * * * *